(12) United States Patent
Wilhelm et al.

(10) Patent No.: US 6,379,015 B2
(45) Date of Patent: *Apr. 30, 2002

(54) INDICATING INSTRUMENT WITH AN ILLUMINATED POINTER DISPOSED BEHIND THE DIAL

(75) Inventors: Heinz Günther Wilhelm, Wiesbaden; Michael Döbler, Babenhausen; Benoit Bauer, Seligenstadt; Heinz Turck, Kelkheim; Helmut Wolf, Hochheim; Frank Pöhlmann, Schaafheim; Stephan Zech, Eltville, all of (DE)

(73) Assignee: Mannesmann VDO AG, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/268,143

(22) Filed: Mar. 12, 1999

(30) Foreign Application Priority Data

Mar. 21, 1998 (DE) .......................................... 198 12 549
Feb. 5, 1999 (DE) .......................................... 199 04 597

(51) Int. Cl.⁷ .............................................. G01D 11/28
(52) U.S. Cl. ........................... 362/23; 362/28; 362/29; 362/30; 116/284; 116/285; 116/288; 40/205
(58) Field of Search .............................. 362/23, 26, 27, 362/30, 28, 29; 361/600, 679, 748; 340/425.5, 438, 439, 459–462; 40/205, 204; 116/256, 257, 263, 284, 286, 288, 310

(56) References Cited

U.S. PATENT DOCUMENTS

| | | | | |
|---|---|---|---|---|
| 4,380,043 A | * | 4/1983 | Takamatsu et al. | 362/26 |
| 4,872,415 A | | 10/1989 | Nakadozono et al. | |
| 4,959,759 A | | 9/1990 | Kohler | |
| 5,187,765 A | * | 2/1993 | Muehlemann et al. | 385/115 |
| 5,272,463 A | * | 12/1993 | Furuya et al. | 340/438 |
| 5,430,612 A | * | 7/1995 | Simon et al. | 361/752 |
| 5,523,922 A | * | 6/1996 | Kato | 362/23 |

FOREIGN PATENT DOCUMENTS

| | | |
|---|---|---|
| DE | 1133905 | 7/1962 |
| DE | 2353645 | 5/1975 |
| DE | 7901406 | 11/1980 |
| DE | 3142098 | 5/1983 |
| DE | 8426953 | 12/1984 |
| DE | 3628440 | 1/1988 |
| DE | 4129057 | 3/1993 |
| DE | 4241719 | 6/1993 |
| DE | 4242913 | 6/1994 |
| DE | 4321146 | 1/1995 |
| DE | 4407855 | 8/1995 |
| DE | 29518248 | 2/1996 |
| EP | 0078372 | 5/1983 |
| EP | 0301439 | 2/1989 |

* cited by examiner

Primary Examiner—Sandra O'Shea
Assistant Examiner—Ismael Negron
(74) Attorney, Agent, or Firm—Martin A. Farber

(57) ABSTRACT

In an indicating instrument (1) with a translucent dial (8), an illuminated pointer (4) is arranged, out of the viewing direction of a viewer, behind the dial (8) on its rear, inner side (7). The surface of the outer side and/or of the inner side of the dial is reflection-reducing so as to enable the dial to serve the function of a covering glass.

27 Claims, 4 Drawing Sheets

INDICATING INSTRUMENT WITH AN ILLUMINATED POINTER DISPOSED BEHIND THE DIAL

FIELD AND BACKGROUND OF THE INVENTION

The invention relates to an indicating instrument, in particular for a vehicle, having a pointer which is connected fixed in terms of rotation to a pointer shaft and can be driven by a pointer shaft, a pointer illumination and a dial, the dial having a scale for representing a value of a variable which is indicated by the pointer.

Indicating instruments of the above type are used, for example, as speedometers or rev counters in contemporary motor vehicles and are generally known. The dial of such a pointer instrument has markings for numbers, symbols or scale graduation markings which contrast with the other regions by their optical transparency or their coloring. Such a blade is composed, for example, of a colored, predominantly translucent film which is applied to a light guide. Arranged behind the light guide is a lamp as light source. Using the lamp, light is introduced into the light guide and passes through the dial to a viewer. The pointer here has a pointer shaft which is designed as a light guide and a pointer vane which can be illuminated and is arranged so as to be capable of rotating with this pointer shaft. Therefore, the viewer perceives a pointer, which can be illuminated by means of a light guide, in front of a completely illuminated dial.

A disadvantage with such a pointer instrument is that, for protection against damage and harmful environmental influences, the rotatably arranged pointer has to be arranged behind a cover plate in order to protect it. This plate should be both totally transparent and essentially free of reflections in order to ensure that the dial can be read reliably. These requirements can be fulfilled only by shaping the plate in a relatively complicated way, which at the same time restricts the design possibilities of the dashboard. Furthermore, it is disadvantageous that the cover plate scratches easily, as a result of which it is more difficult to read the dial and a less satisfactory impression is produced. Moreover, it is disadvantageous that the known pointer instrument has a large physical depth.

SUMMARY OF THE INVENTION

The invention is based on the problem of designing an indicating instrument of the type mentioned at the beginning such that is particularly simple and can be read satisfactorily. At the same time, the installation space for the indicating instrument is to be reduced.

This problem is solved according to the invention with an indicating instrument of the type mentioned at the beginning by virtue of the fact that the dial is translucent and the pointer is arranged on the rear of the dial, on the opposite side from a viewer. The cover plate which is necessary according to the prior art can therefore be dispensed with owing to the arrangement of the pointer in a protected position behind the dial. As a result, the outlay on materials and the weight of the display instrument are considerably reduced. In addition, the indicating instrument has a very small installation depth, which is a great advantage in particular in the case of indicating instruments which are provided for installation in dashboards of motor vehicles—as is the reduction in weight. At the same time, the indicating instrument according to the invention provide design possibilities of shape which permit the ergonomic and stylistic desires of the customer to be fulfilled. In addition, the fabrication of the indicating instrument is simplified since it requires fewer components than known indicating instruments.

A particularly advantageous development of the invention is obtained if the dial is diffusely translucent. As a result, the viewer is prevented from seeing the components of the pointer instrument lying behind the pointer, whereas the illuminated pointer itself—at any rate at least its contour—remains visible. It is therefore unnecessary to provide additional means of covering the rear components.

The dial can be read significantly more easily if the surface of the outer side and/or of the inner side of the dial is designed in a reflection-reducing way. As a result, the contour of the pointer can still be recognized even in unfavorable light conditions, obliquely incident light, for example sunlight, having virtually no negative effect on the ease of reading. Reflection-reducing qualities of the surface of the inner side of the dial ensure that light from the illumination of the pointer is not reflected on the dial. A weakening of the luminosity of the pointer is thus avoided.

It is possible to imagine providing the surface of the outer side of the blade with a reflection-reducing film. However, it is particularly cost-effective and simple if, according to one advantageous development of the invention, the surface of the outer side of the dial is dull, which is an effective means of reducing reflections caused by incident light. During the fabrication of the indicating instrument, the dull surface can advantageously be produced in a simple way if the surface of the outer side of the dial has a surface coating which cures with a dull finish, or has a roughened finish.

A favorable embodiment of the indicating instrument is obtained if the dial is an opal plate. As a result shaded areas caused by components at the rear are reliably avoided and a dial with a homogenous appearance is provided. The material of the opal plate for which milk glass is also a colloquial expression, may be a plastic or glass, for example.

The scale could be arranged, as in conventional pointer instruments, on the side facing the viewer. However, in an indicating instrument of the present invention it is advantageous if the dial has a scale which is arranged on the rear side of the dial which is on the opposite side from the viewer. As a result, in the first instance the scale is arranged protected against damage, and secondly the visual impression of the pointer instrument is not affected by labelings on the outside.

In this context, a development of the invention in which the scaling is engraved into the dial is particularly favorable. This design is, in the first instance well protected against damage and, secondly provides the possibility of allowing the scale to have a brightly lit-up appearance by means of an appropriately arranged light source.

According to another advantageous development of the invention, the pointer illumination has a light source which is connected fixed in terms of rotation to the pointer. As a result, the light transmission path in the pointer may be particularly short, which minimizes the light losses.

The indicating instrument is of particularly bright, and thus also at the same time particularly easily readable design if the light source is arranged on a pointer vane of the pointer. In this design, the pointer vane which is designed in this way contrasts in an easily readable way and also makes it possible, for example, to make the dial colored. The light source here may itself be rotatable about an axis of rotation and preferably be designed in the form of a pointer vane, and thus replace the pointer vane.

The pointer can advantageously be designed in a particularly lightweight way if the pointer illumination has a fixed light source and if light which is emitted by the light source can be injected into the pointer. In this way, a pointer drive which drives the pointer, for example a measuring mechanism, can be designed to generate only a small amount of torque. It is possible here for light which is emitted by the light source to be injected into a pointer shaft which is designed as a light guide, and to be passed on from there into the pointer vane; however, there may also be provision to inject the light directly into a pointer head and direct it from there into the pointer vane.

According to another advantageous development of the invention, a light guide is arranged in the transmission path of the light which is emitted by the light source, between the light source and the pointer, so that the light source does not have to be spatially assigned to the pointer, but rather may be arranged freely in the indicating instrument.

Another advantageous embodiment of the invention is obtained if the pointer has a means for projecting onto a region of the dial the light beams which are emitted by the light source. This means can, for example, reflect the light and, in order to do so, may be of rotatable design and may be arranged in the vicinity of the light source. As a result, a bar of light is projected onto the dial, replacing a conventional pointer, or one region of the dial is illuminated in proportion to the reference variable which is to be represented.

A particularly advantageous embodiment of the invention is obtained if the dial has an optical transparency which is suitable for reading the unilluminated pointer. Here, the contrast between the pointer and the dial may be selected such that the pointing instrument can be read even when the light source fails, which, as an emergency function, contributes significantly to increasing the operational reliability.

It is possible to imagine the indicating instrument being composed of an individual pointer instrument. However, the small physical space required and the clearly organized layout of the instrument according to the invention are particularly emphasized as advantages if the indicating instrument is a combination instrument having at least two displays. According to one advantageous development of the invention, the scope of information which can be represented by means of the indicating instrument is particularly large if one of the displays is a pointer instrument and a further display is a screen, the dial having a cut-out in the vicinity of the screen. Preferably, the screen is an LCD and the front polarizer of the LCD, facing the viewer, has a reflection-reducing surface. In this way, in the first instance the screen is, as an LCD, very operationally reliable and, in addition, it can be mass produced cost-effectively in large numbers and secondly reflection, particularly with strong incident light, on the screen surface is very largely avoided, improving the ease of reading.

A reflection which irritates the viewer and makes the display instrument more difficult to read, as a result of incident light on the surface of the dial and of the screen, is very largely avoided by a reflection-reducing design of the surfaces. However, in particular in motor vehicles, when the ambient light is poor (at night) the indicating instrument may, as a result of the light emitted by it itself, give rise to reflections in side windows of the vehicle which distract the driver of the vehicle. These reflections are effectively eliminated by virtue of the fact that the indicating instrument is inclined downward with respect to the vertical in the direction of a viewer. Light originating from the indicating instrument is therefore emitted in the direction of a lower part of the vehicle, in which there are usually no reflective surfaces. It is usually sufficient here to incline the indicating instrument by merely a few degrees with respect to the vertical.

In one embodiment of the indicating instrument, the scale could be light-proof, and thus contrast with respect to an illuminated main area of the dial. However, it is particularly advantageous if, according to another development of the invention, the scale is translucent. In this way, a particularly effective, multi-colored design of the dial may be obtained.

According to another advantageous development of the invention, the main area of the dial is of a first color and the scale is of a second color, the main area of the dial has a low transmission level when illuminated with light of the color of the scale. The main area of the dial, which forms the visual background for the scale which has, for example, scale graduation marks and/or labelings and/or alphanumeric characters and/or symbols, therefore prevents light with the color of the scale passing through, whereas this light passes through the scale which is thus represented in a particularly contrasting way in comparison with the main area of the dial, this increasing the ease of reading. In order to bring about the optical blocking function, the wavelength ranges of the colors of the main area of the dial and of the scale preferably do not overlap and are as far apart from one another as possible. In the normal color table, the colors are accordingly at locations which are far apart from one another. An indicating instrument which can be very easily read both with a high level of ambient light and with ambient darkness is obtained by means of a high level of contrast between the scale and the main area of the dial if a light source for providing transmissive illumination of the dial is advantageously provided and if the color of the light source corresponds approximately to the color of the scale. As a result, the light from the light source does not reach the viewer through the main area of the dial, but, owing to the light passing through the scale, the scale is distinct, and with a high level of contrast with respect to the main area, can be recognized, and read very easily.

A further improvement in the ease of reading of the indicating instrument is advantageously obtained by virtue of the fact that the pointer is illuminated with a color which corresponds approximately to the color of the main area of the dial. Therefore, the pointer can be recognized very satisfactorily through the main area of the dial, but the pointer cannot be perceived through the scale, since the color of the scale represents a barrier for the light of the pointer. In this way, the scale is effectively prevented from being covered by the pointer.

A particularly small number of light sources are required to illuminate the indicating instrument, and the display has a high level of contrast if the main area of the dial and the scale each advantageously have a high transmission level when illuminated with light of a color which corresponds approximately to their respective color.

Various color pairs, which are far apart in the normal color table, such as for example yellowish green and violet, are conceivable for the color of the main area of the dial and the color of the scale. On the other hand, reliable ease of recognition and satisfactory ease of reading the display are obtained if the color of the main area of the dial is red and the color of the scale is blue.

It is possible to imagine a case in which the dial is completely colored and a material with a different color is, for example, used or injected into certain areas of the scale.

On the other hand, a particularly simple and cost-effective way of manufacturing the dial is obtained if the colors of the main area of the dial and of the scale are preferably printed onto the dial.

If, according to another advantageous development of the invention, the dial has a masked area with low transmission levels in its regions outside displays, the attention of the viewer is concentrated onto the essential regions of the display without being distracted. The masked area can be, for example, a panel or a portion which is printed black.

In particular in indicating instruments which are continuously subjected to environmental influences, for example in vehicles, and possibly have to be cleaned, it is of particular advantage if the dial has a scratch-resistant coating on its outer side facing the viewer.

BRIEF DESCRIPTION OF THE DRAWINGS

The invention permits numerous embodiments. For further clarification of its basic principle, various of these embodiments are represented in the drawings and described below. In said drawings.

DETAILED DESCRIPTION OF THE PREFERRED EMBODIMENTS

Figure 1:
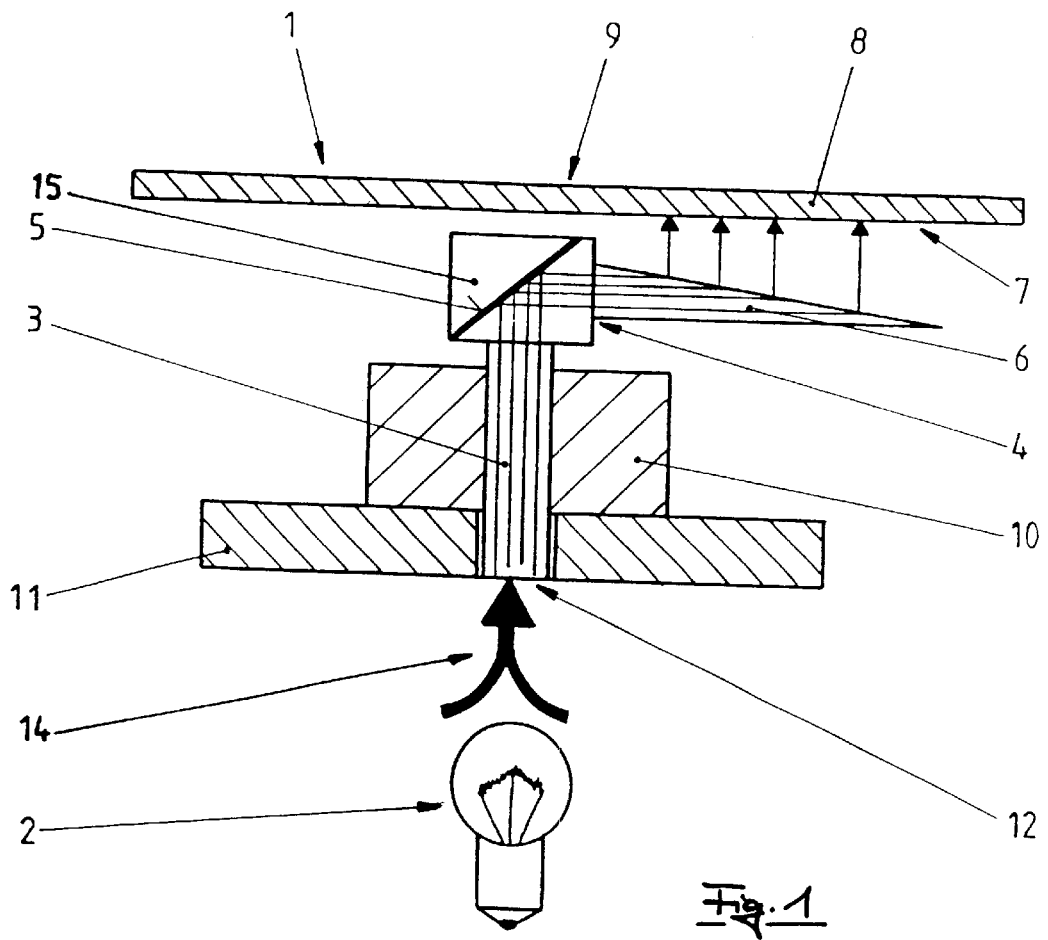
FIG. 1 shows a side view of a sectional basic representation of an indicating instrument according to the invention.

FIG. 1 shows a pointer instrument 1 in a sectional basic representation from the side. A light source 2 whose emitted light beams 14 are introduced into a pointer shaft 3, embodied as a light guide, of a pointer 4, is represented symbolically. The light beams are then deflected into a pointer vane 6 by means of a reflector 5 arranged in a pointer head 15. The light beams emerge at the pointer vane 6 and are projected against an inner side 7 of a diffusely translucent dial 8. A bright bar of light can be identified by the viewer, corresponding to the position of the pointer 4, on an outer side 9, facing the viewer, of the dial 8. A scale, which may be arranged either on the inner side 7 or on the outer side 9 of the dial 8, is not represented. In order to deflect the pointer 4, the shaft 3 is driven by a pointer drive 10 which is arranged on a printed circuit board 11. The printed circuit board 11 simultaneously shields the inner side 7 of the dial 8 with respect to the light source 2 and has a light inlet opening 12 to allow the light beams to pass unimpeded to the pointer shaft 3 which is embodied as a light guide.

Figure 2:
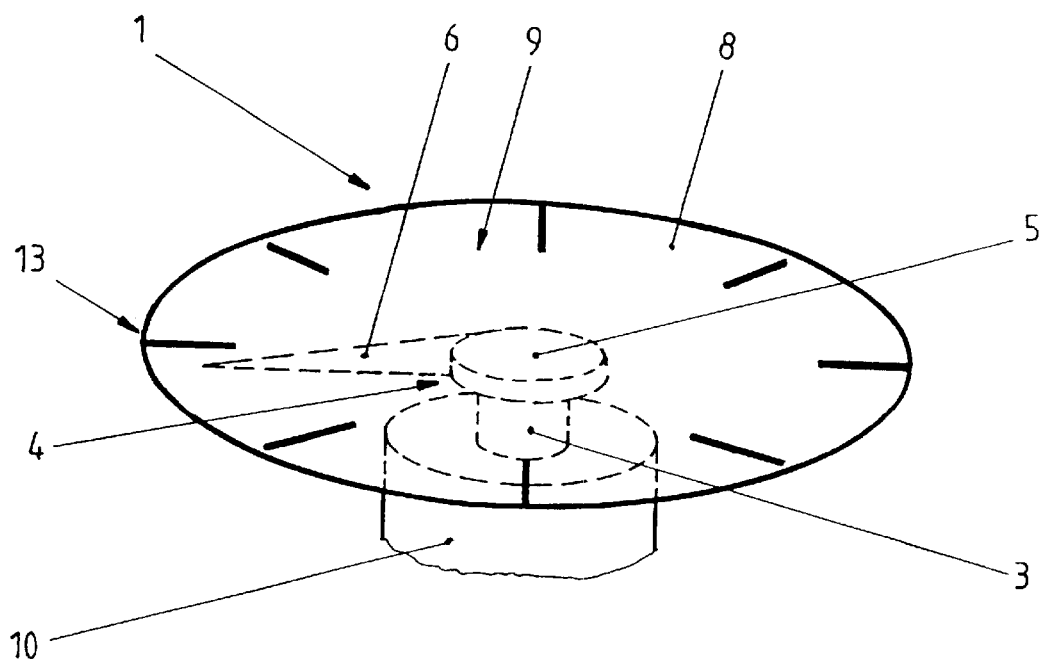
FIG. 2 shows the indicating instrument according to the invention, illustrated in FIG. 1, in a perspective basic representation.

FIG. 2 shows the pointer instrument 1 according to the invention, represented in FIG. 1, in a perspective basic representation in the viewing direction onto the outer side 9 of the dial 8. A scale 13 is merely indicated here and, depending on the purpose of use, may be supplemented in particular with numerals. The contours of the pointer vane 6, of the pointer head 15 and of the pointer shaft 3 of the pointer 4 can only be seen weakly through the diffusely translucent dial 8, and they are therefore represented by broken lines. The pointer vane 6 stands out particularly clearly as soon as it is illuminated by means of the light source (not illustrated). The pointer vane 6 can be deflected by means of the pointer drive 10 which drives the pointer shaft 3, the pointer drive 10 being formed by a measuring mechanism and being represented only in part.

Figure 3:
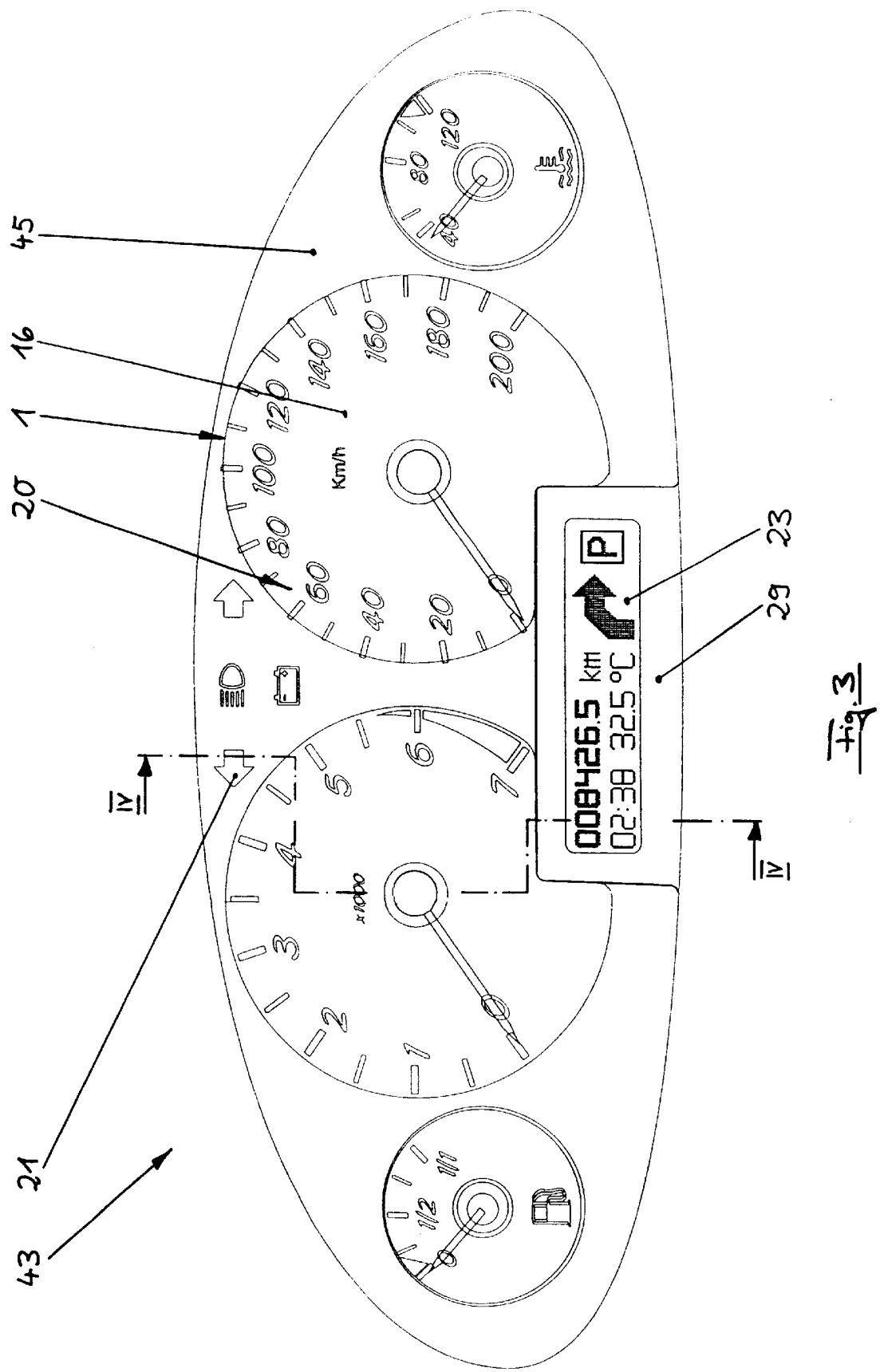
FIG. 3 shows a front view of a second indicating instrument according to the invention.

FIG. 3 represents a front view of an indicating instrument formed by a combination instrument 43. The combination instrument 43 which is provided for installation in a dashboard of a motor vehicle has a plurality of pointer instruments 1 and, as further displays, a screen 23 and display fields 21. The screen 23 which is formed by a liquid crystal display is surrounded by a panel 29. Symbols of the display fields 21 are printed onto a dial 16, as are a masked area 45 and scales 20 of the individual pointer instruments 1.

Figure 4:
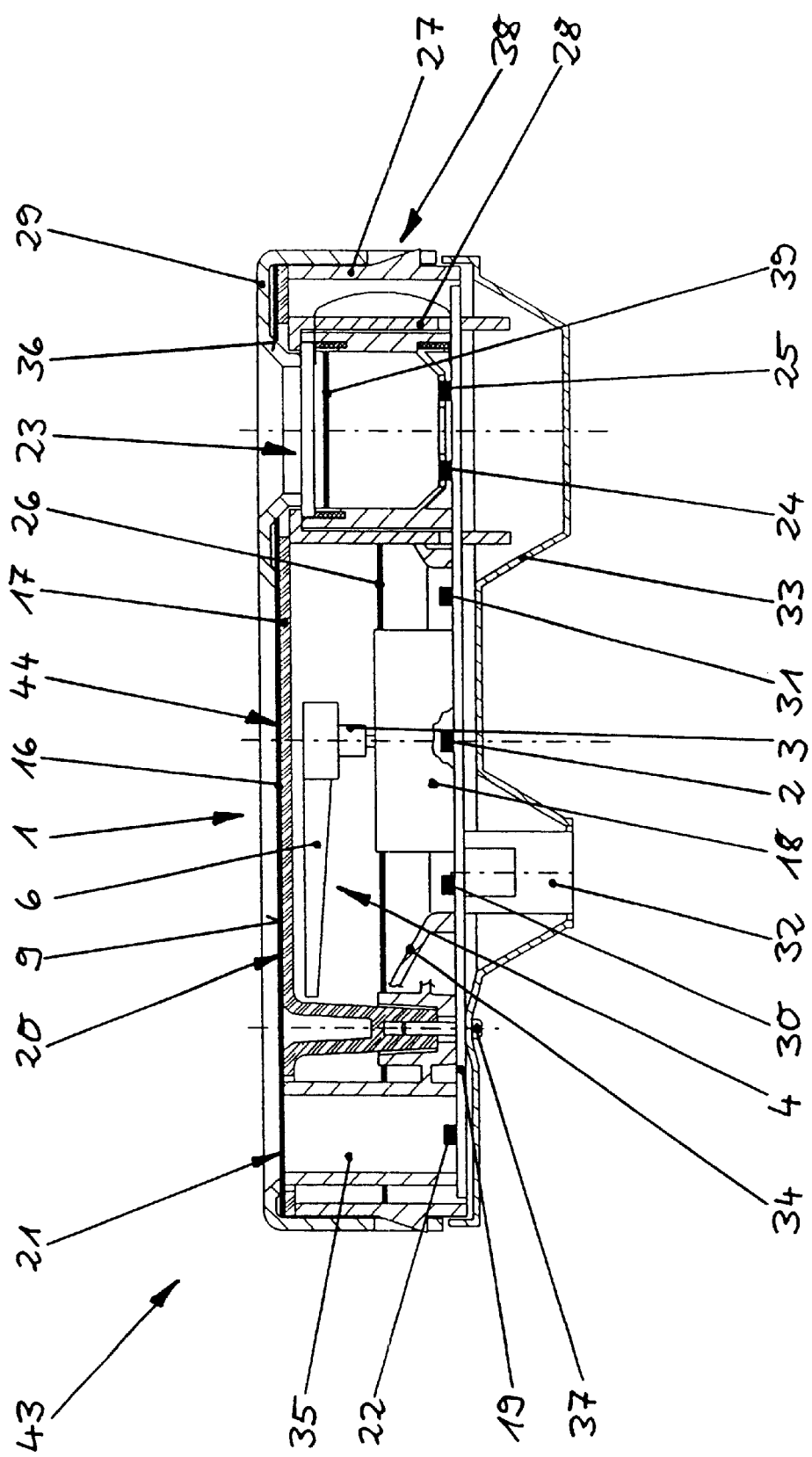
FIG. 4 shows a sectional side view along the line IV—IV of the indicating instrument from FIG. 3.

FIG. 4 shows a section along the line IV—IV (in FIG. 3) of the combination instrument 43. It is clear that a stepping motor 18 is arranged on a printed circuit board 19 as pointer drive of a pointer instrument 1. By means of a pointer shaft 3, the stepping motor 18 drives a pointer 4 which has a pointer vane 6. By means of a light source 2 which is also attached to the printed circuit board 19, the pointer 4 is illuminated by the injection of light into the pointer shaft 3 and the deflection of light into the pointer vane 6. A housing 27 is fitted with the dial 16 on the front side of the combination instrument 43, which faces a viewer, and said housing accommodates both the printed circuit board 19 and a cover 33 at the rear. The display field 21 can be illuminated by means of a light source 22 which is arranged in a light shaft 35 which is formed in the housing 27. Corresponding light sources 24, 25 illuminate, via a diffuser 39 which is connected in between, in order to make the light more uniform, the screen 23 which is mounted on the printed circuit board 19 by means of a mounting frame 28. A panel 29 which is connected to the housing 27 by means of a clip-type connection 38 bounds a visible portion of the screen 23.

The dial 16 is supported by a dial carrier 17 which is secured by means of said carrier and screws 37 which attach the cover 33 to the printed circuit board 19. On its outer side 9 facing the viewer, the dial 16 is provided with a scratch-resistant surface coating which cures with a dull finish. Moreover, the dial 16 has a cut-out 36 so that the screen 23 is not covered by the dial 16. The scale 20 of the dial 16 is printed onto the latter in a blue color, and a main area 44 of the dial 16, forming the visual background of the scale 20, is printed onto the dial 16 in a red color. Light sources 30, 31 (which are LEDs, like the light sources 2, 22, 24, 25) which emit blue light are arranged in the vicinity of the pointer instrument 1 on the printed circuit board 19. A reflector 34 increases the light yield of these light sources 30, 31, and a diffuser 26 which is arranged between the light sources 30, 31 and dial 16 makes the light more uniform. When the light sources 30, 31 are switched on, the main area 44 of the dial 16 has a dark appearance, whereas the scale 20 is lit up owing to its blue printed area. When the pointer vane 6 is illuminated red, it can be read very easily by virtue of the red color of the main area 44, whereas the blue printed area of the scale 20 prevents the red light emerging from the pointer vane 6 from passing through. In this way, the scale is prevented from being covered by the pointer vane.

On the rear of the printed circuit board 19 there is fitted a plug socket 32 for making electrical contact between the combination instrument 43 and the vehicle's electronics.

Figure 5:
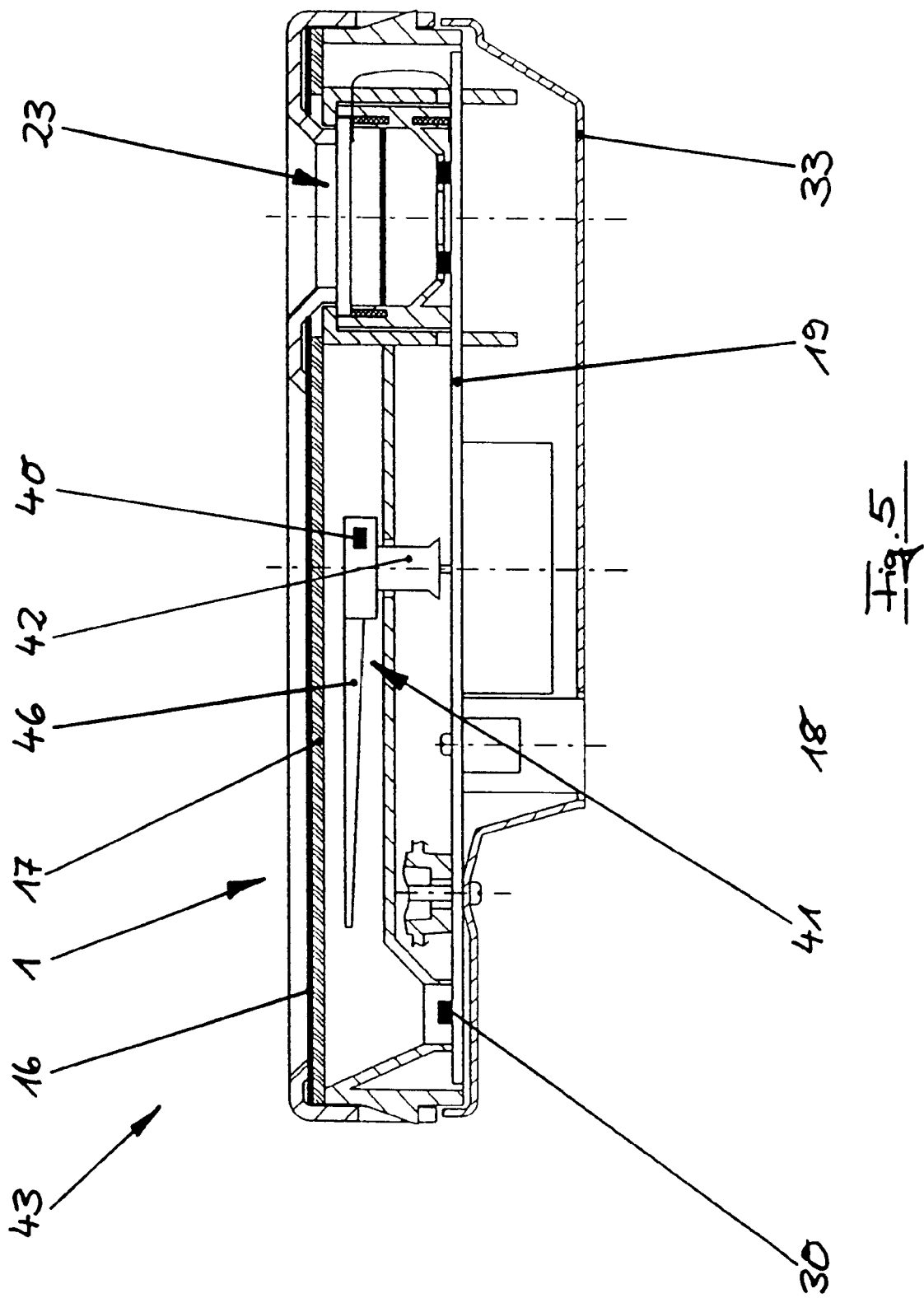
FIG. 5 shows a sectional side view similar to FIG. 4 of a further indicating instrument.

A further combination instrument 43 which is similar to the indicating instrument in FIG. 4 is shown in FIG. 5; corresponding components are provided here with the same reference symbols, as are the preceding figures also.

In contrast to the exemplary embodiments above, a pointer instrument 1 of the combination instrument 43 has here a pointer 41 with a pointer vane 46 which is supported by a pointer shaft 42 and which is illuminated by a light source 40 which is arranged in the pointer 41. The light source 40, which is an LED here, is placed in electrical contact (in a way which is not illustrated) with a printed circuit board 19 in order to provide it with power.

We claim:

1. An indicating instrument, in particular for a vehicle, having a pointer comprising a vane, which vane is connected fixed in terms of rotation to a pointer shaft and can be driven by the pointer shaft, a pointer light source for illumination and a dial, the dial having a scale for representing a value of a variable shown by the pointer, wherein the dial is translucent to prevent a clear view of components behind the pointer, the pointer is arranged extending along the opposite side of the dial from a viewer, a surface of the dial on its outer side is reflection-reducing, and the dial has an optical transparency which is suitable for reading the pointer by illumination of the pointer with light from the light source, the optical transparency being suitable for reading the pointer in the absence of the illumination with light from the light source by contrast between the pointer and the dial.

2. The indicating instrument as claimed in claim 1, wherein the dial is diffusely translucent.

3. The indicating instrument as claimed in claim 1, wherein the dial is an opal plate.

4. The indicating instrument as claimed in claim 1, wherein the indicating instrument is inclined downward with respect to the vertical in the direction of a viewer.

5. The indicating instrument as claimed in claim 1, wherein the scale is translucent.

6. The indicating instrument as claimed in claim 1, wherein the dial has a scratch-resistant coating on its outer side facing the viewer.

7. The indicating instrument as claimed in claim 1, wherein the dial has a scale which is arranged on the opposite side of the dial from the viewer.

8. The indicating instrument as claimed in claim 7, wherein the scale is engraved into the dial.

9. The indicating instrument as claimed in claim 1, wherein the light source is connected fixed in terms of rotation to the pointer.

10. The indicating instrument as claimed in claim 9, wherein the light source is arranged on a pointer vane of the pointer.

11. The indicating instrument as claimed in claim 1, wherein the light source is fixed, and wherein light which is emitted by the light source is injectable into the pointer.

12. The indicating instrument as claimed in claim 11, further comprising a light guide disposed in a transmission path of the light which is emitted by the light source, between the light source and the pointer.

13. The indicating instrument as claimed in claim 12, wherein the pointer has a means for projecting onto a region of the dial the light beams which are emitted by the light source.

14. The indicating instrument as claimed in claim 1, wherein a main area of the dial is of a first color and the scale is of a second color, the main area of the dial having a low transmission level when illuminated with light of the color of the scale.

15. The indicating instrument as claimed in claim 14, wherein the light source is operative for transmissive illumination of the dial, and wherein the color of the light source corresponds approximately to the color of the scale.

16. The indicating instrument as claimed in claim 14, wherein the pointer is illuminated with a color which corresponds approximately to the color of the main area of the dial.

17. The indicating instrument as claimed in claim 14, wherein the main areas of the dial and of the scale each have a high transmission level when illuminated with light of a color which corresponds approximately to their respective colors.

18. The indicating instrument as claimed in claim 14, wherein the color of the main area of the dial is red, and the color of the scale is blue.

19. The indicating instrument as claimed in claim 14, wherein colors of the main areas of the dial and of the scale are printed onto the dial.

20. The indicating instrument as claimed in claim 1, wherein the indicating instrument is a combination instrument having at least two displays.

21. The indicating instrument as claimed in claim 20, wherein one of the displays is a pointer instrument and a further one of the displays has a screen, the dial having a cut-out in the region of the screen.

22. The indicating instrument as claimed in claim 16, wherein the screen is an LCD, and wherein a front polarizer of the LCD, facing the viewer, has a reflection-reducing surface.

23. The indicating instrument as claimed in claim 20, wherein the dial has, in its regions outside the displays, a masked area with a low transmission level.

24. An indicating instrument, in particular for a vehicle, having a pointer comprising a vane, which vane is connected fixed in terms of rotation to a pointer shaft and can be driven by the pointer shaft, a pointer light source for illumination and a dial, the dial having a scale for representing a value of a variable shown by the pointer, wherein the dial is translucent to prevent a clear view of components behind the pointer, the pointer is arranged extending along the opposite side of the dial from a viewer, a surface of the dial is reflection-reducing, and the dial has an optical transparency which is suitable for reading the pointer by illumination of the pointer with light from the light source, the optical transparency being suitable for reading the pointer in the absence of the illumination with light from the light source by contrast between the pointer and the dial, and wherein the surface of the outer side of the dial is dull.

25. The indicating instrument as claimed in claim 24, wherein the surface of the outer side of the dial has a surface coating which cures with a dull finish, or has a roughened finish.

26. An indicating instrument, in particular for a vehicle, having a pointer comprising a vane, which vane is connected fixed in terms of rotation to a pointer shaft and can be driven by the pointer shaft, a pointer light source for illumination and a dial, the dial having a scale for representing a value of a variable shown by the pointer, wherein the dial is translucent to prevent a clear view of components behind the pointer, the pointer is arranged on the opposite side of the dial from a viewer, a surface of the dial on its outer side is reflection-reducing, a contrast between the pointer and the dial enabling a reading of the pointer in the absence of illumination from said light source, and the indicating instrument is inclined downward with respect to a viewing direction of a viewer.

27. An indicating instrument, in particular for a vehicle, having a pointer comprising a vane, which vane is connected fixed in terms of rotation to a pointer shaft and can be driven by the pointer shaft, a pointer light source for illumination and a dial, the dial having a scale for representing a value of a variable shown by the pointer, wherein the dial is translucent to prevent a clear view of components behind the pointer, the pointer is arranged extending along the opposite side of the dial from a viewer, the dial is reflection-reducing on a surface of its outer side, the dial has an optical transparency which is suitable for reading the pointer by illumination of the pointer with light from the light source, the optical transparency being suitable for reading the pointer in the absence of the illumination with light from the light source by contrast between the pointer and the dial.

* * * * *